US011625671B2

(12) United States Patent
Clarke

(10) Patent No.: US 11,625,671 B2
(45) Date of Patent: Apr. 11, 2023

(54) VENDING SYSTEM AND METHOD OF AUTOMATICALLY VENDING

(71) Applicant: Ocado Innovation Limited, Herts (GB)

(72) Inventor: Paul Clarke, Herts (GB)

(73) Assignee: OCADO INNOVATION LIMITED, Herts (GB)

( * ) Notice: Subject to any disclaimer, the term of this patent is extended or adjusted under 35 U.S.C. 154(b) by 529 days.

(21) Appl. No.: 16/487,120

(22) PCT Filed: Feb. 19, 2018

(86) PCT No.: PCT/EP2018/054001
§ 371 (c)(1),
(2) Date: Aug. 20, 2019

(87) PCT Pub. No.: WO2018/150017
PCT Pub. Date: Aug. 23, 2018

(65) Prior Publication Data
US 2020/0387867 A1    Dec. 10, 2020

(30) Foreign Application Priority Data
Feb. 20, 2017 (GB) .................... 1702746

(51) Int. Cl.
*G06Q 10/08* (2012.01)
*G06Q 10/0835* (2023.01)
(Continued)

(52) U.S. Cl.
CPC ....... *G06Q 10/08355* (2013.01); *G06N 20/00* (2019.01); *G06Q 10/087* (2013.01);
(Continued)

(58) Field of Classification Search
CPC .......... G06Q 10/08355; G06Q 10/087; G06Q 30/0205; G06Q 30/0226; G06Q 50/30; G06N 20/00
See application file for complete search history.

(56) References Cited

U.S. PATENT DOCUMENTS 7,357,314 B2    4/2008 Kusakawa
10,303,171 B1 *  5/2019 Brady ................. G05D 1/0297
(Continued)

FOREIGN PATENT DOCUMENTS

CA    2456959 A1 *  7/2005 ............... G07F 9/00
CA    2636537 A1   12/2009
(Continued)

OTHER PUBLICATIONS

Zeaman, John, "Invasion of the vending machines; They're everywhere now, like robotic sentinels, and getting bigger—one's the size of a convenience store," The Record, All Editions=Sunday, Bergen County, New Jersey, Aug. 17, 2003, F.01.*
(Continued)

*Primary Examiner* — Nathan Erb
(74) *Attorney, Agent, or Firm* — Buchanan Ingersoll & Rooney PC

(57) ABSTRACT

An automated vending system includes a physical item storage unit, and a plurality of land-based transportation mechanisms, or vehicles, arranged to store a predicted number and assortment of items to vend. A processing resource can communicate with the plurality of transportation vehicles, and is arranged to support a machine learning module. A plurality of data sources is arranged to provide data to the machine learning module to determine a plurality of respective actions for the plurality of transportation vehicles. The processing resource can communicate respective control instructions to the plurality of transportation vehicles. A selected transportation mechanism which
(Continued)

receives the control instruction can operate in response to the control instruction in order to convey the item to a determined vending location.

11 Claims, 14 Drawing Sheets

(51) Int. Cl.
*G06N 20/00* (2019.01)
*G06Q 10/087* (2023.01)
*G06Q 30/0204* (2023.01)
*G06Q 30/0226* (2023.01)
*G06Q 50/30* (2012.01)

(52) U.S. Cl.
CPC ..... *G06Q 30/0205* (2013.01); *G06Q 30/0226* (2013.01); *G06Q 50/30* (2013.01)

(56) References Cited

U.S. PATENT DOCUMENTS

| | | | |
|---|---|---|---|
| 2004/0232227 A1 | 11/2004 | Kusakawa | |
| 2005/0090933 A1* | 4/2005 | Ebert | B25J 9/1694 700/245 |
| 2006/0241965 A1* | 10/2006 | Walker | G06Q 20/20 221/237 |
| 2007/0125104 A1* | 6/2007 | Ehlers | G07F 9/105 62/157 |
| 2008/0033595 A1* | 2/2008 | Packes | G06Q 30/0223 700/232 |
| 2008/0040211 A1* | 2/2008 | Walker | G06Q 30/0247 705/14.46 |
| 2012/0004770 A1* | 1/2012 | Ooyen | G16H 20/13 700/235 |
| 2012/0234852 A1* | 9/2012 | Guthrie | B65G 59/00 221/119 |
| 2013/0251479 A1* | 9/2013 | Waugh | G16H 20/13 414/222.01 |
| 2013/0325768 A1* | 12/2013 | Sinyavskiy | G06N 3/049 706/16 |
| 2014/0136414 A1 | 5/2014 | Abhyanker | |
| 2014/0310048 A1* | 10/2014 | Murray | G06Q 10/06315 705/7.22 |
| 2014/0370167 A1 | 12/2014 | Garden | |
| 2015/0356501 A1 | 12/2015 | Gorjestani et al. | |
| 2015/0370251 A1 | 12/2015 | Siegel et al. | |
| 2016/0162865 A1* | 6/2016 | Crow | G06Q 20/18 705/22 |
| 2016/0221757 A1 | 8/2016 | Dewitt et al. | |
| 2016/0275746 A1* | 9/2016 | Stinson | G07F 11/62 |
| 2016/0355337 A1* | 12/2016 | Lert | B65G 1/0492 |
| 2017/0032607 A1* | 2/2017 | Longman | G07F 11/165 |

FOREIGN PATENT DOCUMENTS

| | | | | |
|---|---|---|---|---|
| CN | 203397422 U | * | 1/2014 | ............. G07F 11/00 |
| CN | 104392547 A | | 3/2015 | |
| CN | 105913565 A | | 8/2016 | |
| DE | 10026899 A1 | * | 12/2001 | ............. G07F 9/00 |
| DE | 202015001302 U1 | * | 5/2015 | ............. G07F 11/28 |
| JP | 4-123291 | * | 4/1992 | ............. G07F 9/00 |
| JP | 7-195282 | * | 8/1995 | ............. B25J 5/00 |
| JP | 2004192600 A | | 7/2004 | |
| JP | 2005284587 A | | 10/2005 | |
| JP | 2008-140212 | * | 6/2008 | ............. G07F 11/00 |
| WO | 2015185628 A2 | | 12/2015 | |
| WO | WO 2015/197903 A1 | * | 12/2015 | ............. G06F 11/16 |
| WO | 2016066859 A1 | | 5/2016 | |

OTHER PUBLICATIONS

Office Action dated Aug. 18, 2021, by the Chinese Patent Office in corresponding Chinese Patent Application No. 201880012760.0. (11 pages).
Office Action dated Nov. 19, 2021, by the Canadian Patent Office in corresponding Canadian Patent Application No. 3,053,046. (4 pages).
Combined Search Report and Abbreviated Examination Report issued in corresponding British Patent Application No. GB1802625. 2, 8 pages (dated Jul. 25, 2018).
International Search Report and Written Opinion issued in corresponding International Patent Application No. PCT/EP2018/054001, 14 pages (dated Jun. 16, 2018).
Office Action (Decision of Rejection) dated Feb. 24, 2021, by the Japanese Patent Office in corresponding Japanese Patent Application No. 2019-545300, and an English Translation of the Office Action. (4 pages).
International Preliminary Report on Patentability and Written Opinion of the International Searching Authority (Forms PCT/IB/373 and PCT/ISA/237) dated Aug. 20, 2019, by the International Bureau of WIPO, in corresponding International Application No. PCT/EP2018/054001. (7 pages).
Office Action (Examination Report No. 1) dated Oct. 18, 2021, by the Australian Patent Office in corresponding Australian Patent Application No. 2018222783. (6 pages).
Office Action dated Sep. 29, 2021, by the Israeli Patent Office in corresponding Israeli Patent Application No. P-589158-IL. (3 pages).
Fukunari et al., "Decision-Tree Learning in Dwell Point Policies in Autonomous Vehicle Storage and Retrieval Systems (AVSRS)", Machine Learning and Applications, Dec. 16, 2004, pp. 81-84, XP032424768.
Hu et al., "A Framework for the Selection of Idle Vehicle Home Locations in an Automated Guided Vehicle System", International Journal of Production Research, Feb. 1, 2000, vol. 38, No. 3, pp. 543-562, XP055896857.
Le-Anh et al., "ERIM Report Series Research in Management, A Review of Design and Control of Automated Guided Vehicle Systems", Erasmus Research Institute of Management, May 1, 2004, pp. 1-37, XP 055896945.
Office Action (Examination Report No. 2) dated Jan. 27, 2022, by the Australian Patent Office in corresponding Australian Patent Application No. 2018222783. (6 pages).
Office Action (Summons to Attend Oral Proceedings) dated Mar. 16, 2022, by the European Patent Office in corresponding European Patent Application No. 18707872.0. (10 pages).
Office Action (Examination Report No. 3) dated Jul. 6, 2022, by the Australian Patent Office in corresponding Australian Patent Application No. 2018222783. (7 pages).
Office Action (Request for the Submission of an Opinion) dated Sep. 8, 2022, by the Korean Patent Office in corresponding Korean Patent Application No. 10-2019-7026796, and an English Translation of the Office Action. (15 pages).
Office Action dated Sep. 28, 2022, by the Chinese Patent Office in corresponding Chinese Patent Application No. 201880012760.0, and a machine English Translation of the Office Action. (30 pages).
Office Action dated Nov. 10, 2022, by the Canadian Patent Office in corresponding Canadian Patent Application No. 3,053,046. (3 pages).
Office Action dated Nov. 21, 2022, by the Israeli Patent Office in corresponding Israeli Patent Application No. 268528/2, and a partial English Translation of the Office Action. (8 pages).

\* cited by examiner

VENDING SYSTEM AND METHOD OF AUTOMATICALLY VENDING

This application claims priority from UK Patent Application No. GB1702746.7 filed on 20 Feb. 2017, the content of all of this application hereby being incorporated by reference.

FIELD OF THE INVENTION

The present invention relates to an automated vending system of the type that, for example, conveys a requested item to a vending location. The present invention also relates to a method of automatically vending an item, the method being of the type that, for example, conveys a requested item to a vending location.

BACKGROUND OF THE INVENTION

Many vending systems are known to be based on different architectures and different scales. Vending systems can range from self-contained food and beverage vending systems to much larger, distributed, systems requiring vehicles to deliver items. Irrespective of the scale of the system, inefficiencies can exist. For example, availability of certain items to vend is usually limited and the speed of conveying the items to a vending location, where the intended recipient of the item can receive the item, is also limited for some systems. Some larger systems are limited in their ability to access some locations. Furthermore, some items provided through vending systems are perishable and so must be sold before a so-called "sell by" date, otherwise the vending system will possess unsaleable stock once the sell by date is reached.

Typically, some vending systems are in the form of e-commerce solutions that comprise dedicated order fulfilment centres. Orders placed by customers are fulfilled by picking items ordered by the customers from stock at the order fulfilment centre and loading the picked items onto delivery vehicles for delivery of the items to the customers.

BRIEF SUMMARY OF THE INVENTION

According to a first aspect of the present invention, there is therefore provided an automated vending system comprising: a physical item storage unit for storing therein a distribution of different items to be vended; a plurality of land-based transportation mechanisms for transporting items to an identified location, the plurality of transportation vehicles being arranged to store, when in use, a predicted number and assortment of items to vend; a processing resource capable of communicating with the plurality of transportation mechanisms, the processing resource being arranged to support a machine learning module; a plurality of data sources arranged to provide data to the machine learning module; wherein the machine learning module is arranged to analyse the data provided by the plurality of data sources and to determine a plurality of respective actions for the plurality of transportation mechanisms; the processing resource is arranged to generate and communicate respective control instructions to the plurality of transportation mechanisms; and the selected transportation mechanism is arranged to receive the control instruction and to operate in response to the control instruction in order to convey the item to the determined vending location.

The identified location may be a geographic area.

The system may further comprise: a communications module operably coupled to the processing resource; the communications module may be arranged to receive a request to vend an item.

The processing resource may be arranged to determine forecast demands in respect of a plurality of items.

The processing resource may be arranged to predict respective initial optimised locations for the plurality of transportation mechanisms; and the processing resource may be arranged to generate and communicate an initial positioning instruction to the one or more of the plurality of transportation mechanisms.

The plurality of transportation mechanisms may each be arranged to store respective distributions of different items.

A number of the plurality of transportation mechanisms may have a storage capacity and so constitute a number of mobile physical item storage units.

At least one of the plurality of data sources may comprise learnt data.

The machine learning module may comprise a policy implementable to determine the plurality of respective actions.

The machine learning module may comprise a reward signal calculator.

The physical item storage unit may be static.

The machine learning module may be arranged to update the policy in response to an output reward signal generated by the reward signal calculator.

The plurality of transportation mechanisms may comprise: a first transportation mechanism; a second transportation mechanism; and the control instruction may comprise a meeting waypoint; wherein the meeting waypoint communicated to the first transportation mechanism may be a location of the second transportation mechanism or a location at which the second transportation mechanism is to meet the first transportation mechanism; and the processing resource may be arranged to generate and communicate to the second transportation mechanism another control instruction identifying the meeting waypoint; the control instruction and the another control instruction may comprise an instruction to transfer the item from the second transportation mechanism to the first transportation mechanism.

The transfer of the item from the second transportation mechanism to the first transportation mechanism may constitute a restocking of the second transportation mechanism.

The second transportation mechanism may be larger than the first transportation mechanism.

The plurality of transportation mechanisms may comprise: a first transportation mechanism; a second transportation mechanism; wherein the processing resource may be arranged to identify the first transportation mechanism to convey the item and the second transportation mechanism to convey another item; and the processing resource may be arranged to generate and communicate the control instruction to the first transportation mechanism in respect of the item and another control instruction to the second transportation mechanism in respect of the another item.

The plurality of transportation mechanisms may comprise at least two different types of transportation mechanism.

The plurality of transportation mechanisms may comprise one or more of a van, a motorcycle and an automobile.

The identified vending location may be a location from where the item is to be collected.

The vending location may not be a dwelling or other building. The vending location may be off-street.

The system may further comprise another physical storage unit for storing therein a second distribution of different items to be vended; the second physical item storage unit may have smaller capacity than the physical item storage unit.

The system may further comprise a further physical item storage unit for storing therein a further distribution of different items to be vended; the further physical item storage unit may have a smaller capacity than the another physical item storage unit.

The request to vend the item may be accepted based upon a plurality of predetermined criteria.

The plurality of predetermined criteria may comprise an economic criterion.

The plurality of predetermined criteria may comprise an ease of access criterion associated with the selected transportation mechanism.

The ease of access criterion may be traffic data. The ease of access data may be parking restrictions.

The plurality of predetermined criteria may comprise an environmental criterion.

The environmental criterion may be meteorological conditions.

The plurality of predetermined criteria may comprise a need to deplete an inventory of the selected transportation mechanism.

The processing resource may further comprise an ordering system.

The ordering system may be arranged to adjust an offer to vend the item in order to facilitate depletion of the inventory.

The ordering system may be arranged to support a plurality of vending portals; a vending portal of the plurality of vending portals may be dynamically arranged to vend items available within a predetermined geographical region served by a number of the plurality of transportation mechanisms and stock available from the number of the plurality of transportation mechanisms.

According to a second aspect of the present invention, there is therefore provided a method of vending an item, the method comprising: storing a distribution of different items to be vended in a physical item storage unit; providing a plurality of land-based transportation mechanisms for transporting items to an identified location; storing a predicted number and assortment of items to vend respectively in the plurality of transportation vehicles; providing a plurality of data sources to a machine learning module; the machine learning module analysing data provided by the plurality of data sources and determining a plurality of respective actions for the plurality of transportation mechanisms; generating and communicating respective control instructions to the plurality of transportation mechanisms; and the selected transportation mechanism receiving the control instruction and operating in response to the control instruction in order to convey the item to the determined vending location.

It is thus possible to provide an automated vending system and method of automatic vending that provides faster vending of items and with no minimum number of items requiring vending. The system and method support 24 hour vending and can support the vending of a greater variety of items. The system and method support improved availablilty of a range of items.

BRIEF DESCRIPTION OF THE DRAWINGS

At least one embodiment of the invention will now be described, by way of example only, with reference to the accompanying drawings, in which.

DETAILED DESCRIPTION OF THE INVENTION

Figure 1:
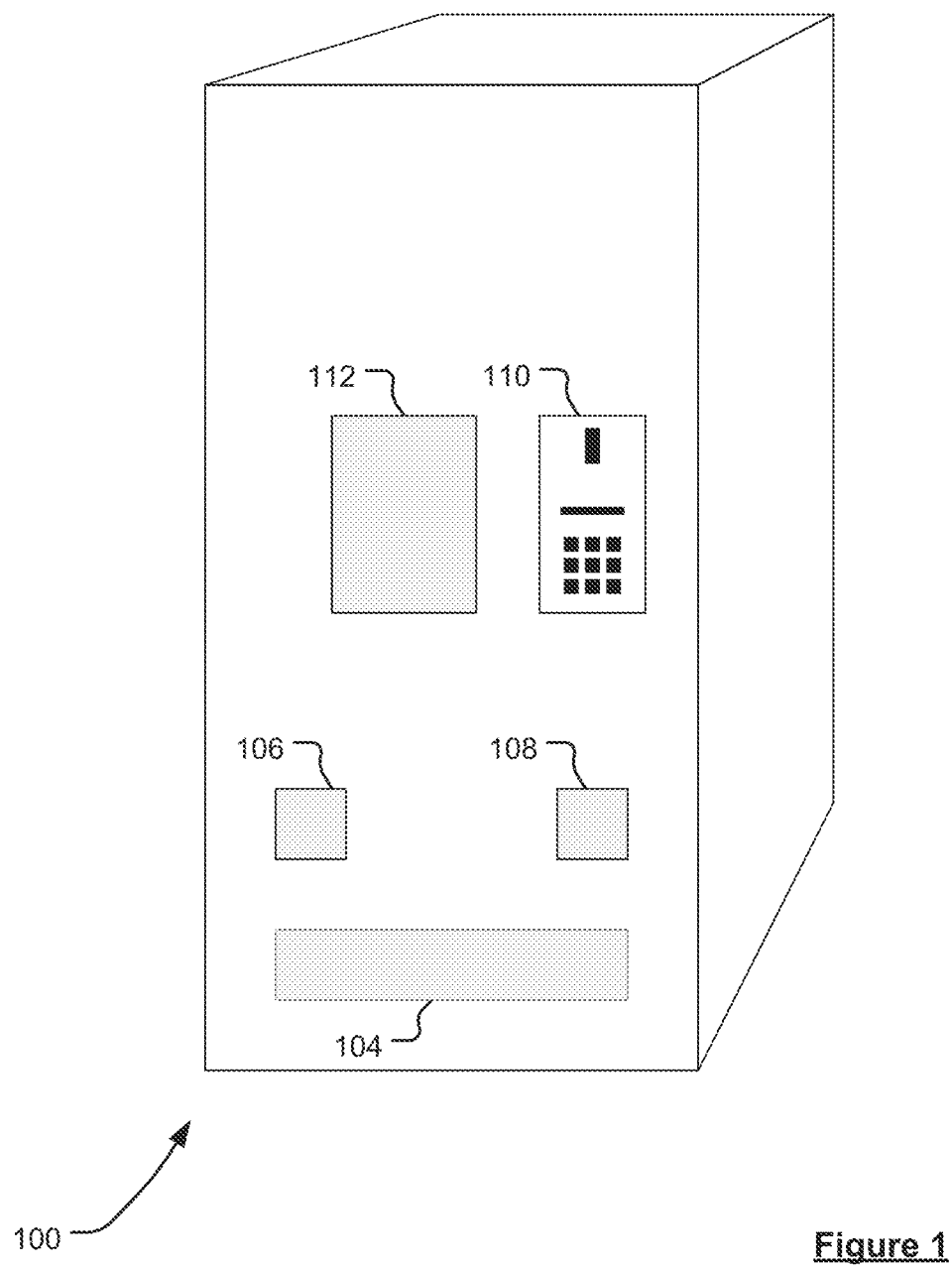
FIG. 1 is a schematic diagram of a vending system constituting an embodiment of the invention.

Throughout the following description, identical reference numerals will be used to identify like parts.

Referring to FIG. 1, an automatic vending system 100, for example a robotic vending machine, comprises a housing 102 in which a first item delivery port 104, a second item delivery port 106 and a third item delivery port 108 are provided. The vending system 100 also comprises a payment point module 110 and a touch screen device 112. The vending system 100 is somewhat larger than traditional vending machines in order to stock a greater number and variety of items as well as house a robotic delivery arrangement.

Figure 2:
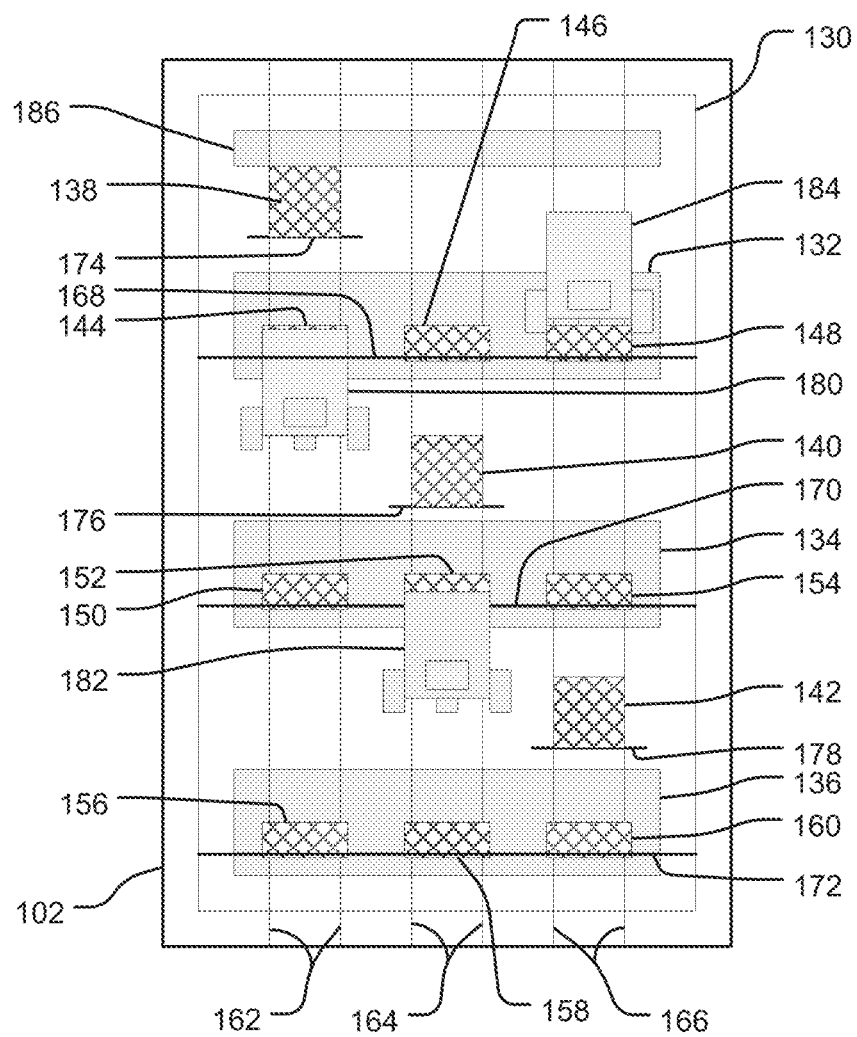
FIG. 2 is a schematic diagram of an interior of the vending system of FIG. 1 in greater detail.

Turning to FIG. 2, the above-mentioned robotic delivery arrangement is disposed inside the housing 102. The vending system 100 comprises a main, or first tier, item store 130, a first secondary, or second tier, item store 132, a second secondary, or second tier, item store 134 and a third secondary, or second tier, item store 136. In this example, the main item store 130 is disposed at the rear the housing 102 and the first, second and third secondary item stores 132, 134, 136 are disposed in suspended arrangement opposite the main item store 130. In this example, the first, second and third secondary item stores 132, 134, 136 are respectively coupled to upper, middle and lower regions of the main item store 130.

The main item store 130 comprises a first, upper, item access port 138, a second, middle, item access port 140, and a third, lower, item access port 142. The first secondary item store 132 comprises first, second and third secondary item access ports 144, 146, 148. The second secondary item store 134 comprises fourth, fifth and sixth secondary item access ports 150, 152, 154. The third secondary item store 136 comprises seventh, eighth and ninth secondary item access ports 156, 158, 160.

A first vertical cable pair 162, a second vertical cable pair 164 and a third vertical cable pair 166 respectfully extend from the top to the bottom of the housing 102. The first, second and third vertical cable pairs 162, 164, 166 are disposed in lateral spaced relation and each pair maintains a predetermined separation therebetween. The first vertical cable pair 162 is aligned with the first, fourth and seventh secondary item access ports 144, 150, 156, as well as the first upper item access port 138. The second vertical cable pair 164 is aligned with the second, fifth and eighth secondary item access ports 146, 152, 158. The third vertical cable pair 166 is aligned with the third, sixth and ninth secondary item access ports 148, 154, 160.

The vending system 100 also comprises a first upper ledge 168, a second middle ledge 170 and a third lower ledge 172. The first upper ledge 168 is aligned with lower edges of the first, second and third secondary item access ports 144, 146, 148. The second middle ledge 170 is aligned with lower edges of the fourth, fifth and sixth secondary item access ports 150, 152, 154. The third lower ledge 172 is aligned with lower edges of the seventh, eighth and ninth secondary item access ports 156, 158, 160. The first, second and third ledges 168, 170, 172 are wide enough to accommodate robot modules, details of which will be described later herein, and to allow them to travel therealong.

A first transverse path 174 extends from a lower edge of the first, upper, item access port 138 towards the first vertical cable pair 162. A second transverse path 176 extends from a lower edge of the second, middle, item access port 140 towards the second vertical cable pair 164. A third transverse path 178 extends from a lower edge of the third, lower, item access port 142 towards the third vertical cable pair 166.

The vending system 100 further comprises a first mobile robot module 180, a second mobile robot module 182 and a third mobile robot module 184 within the housing 102. The first, second and third mobile robot modules 180, 182, 184 are arranged to travel along the first, second and third vertical cable pairs 162, 164, 166, the first, second and third ledges 168, 170, 172 and the first, second and third transverse paths, 174, 176, 178.

Although not shown in FIG. 2, the main item store 130 comprises a conveyor chain mechanism arranged in a continuous loop and to carry a standardised optionally disposable type of container in which items to be vended are stored. In this example, the container comprises an interface point or points compatible with being carried by the conveyor chain mechanisms. The loop of the chain mechanism is arranged to pass past the first, second and third access ports 138, 140, 142. Similarly, the first, second and third secondary item stores 132, 134, 136 each comprise a conveyor chain mechanism arranged in a continuous loop and to carry the standardised type of container. The loops of the respective conveyor chain mechanisms pass the first, second and third secondary item access ports 144, 146, 148, the fourth, fifth and sixth secondary item access ports 150, 152, 154, and the seventh, eighth and ninth secondary item access ports 156, 158, 160.

A central processing resource module 186 is also disposed within the housing 102 and is capable of communicating with the first, second third robot modules 180, 182, 184, the main item store 130 and the first, second and third secondary item stores 132, 134, 136.

The main item store 130 and the first, second and third secondary item stores 132, 134, 136 each respectively comprise a controller (not shown) to translate the associated conveyor chain mechanism in response to an instruction received from the central processing resource 186 to advance or reverse the conveyor chain.

Figure 3:
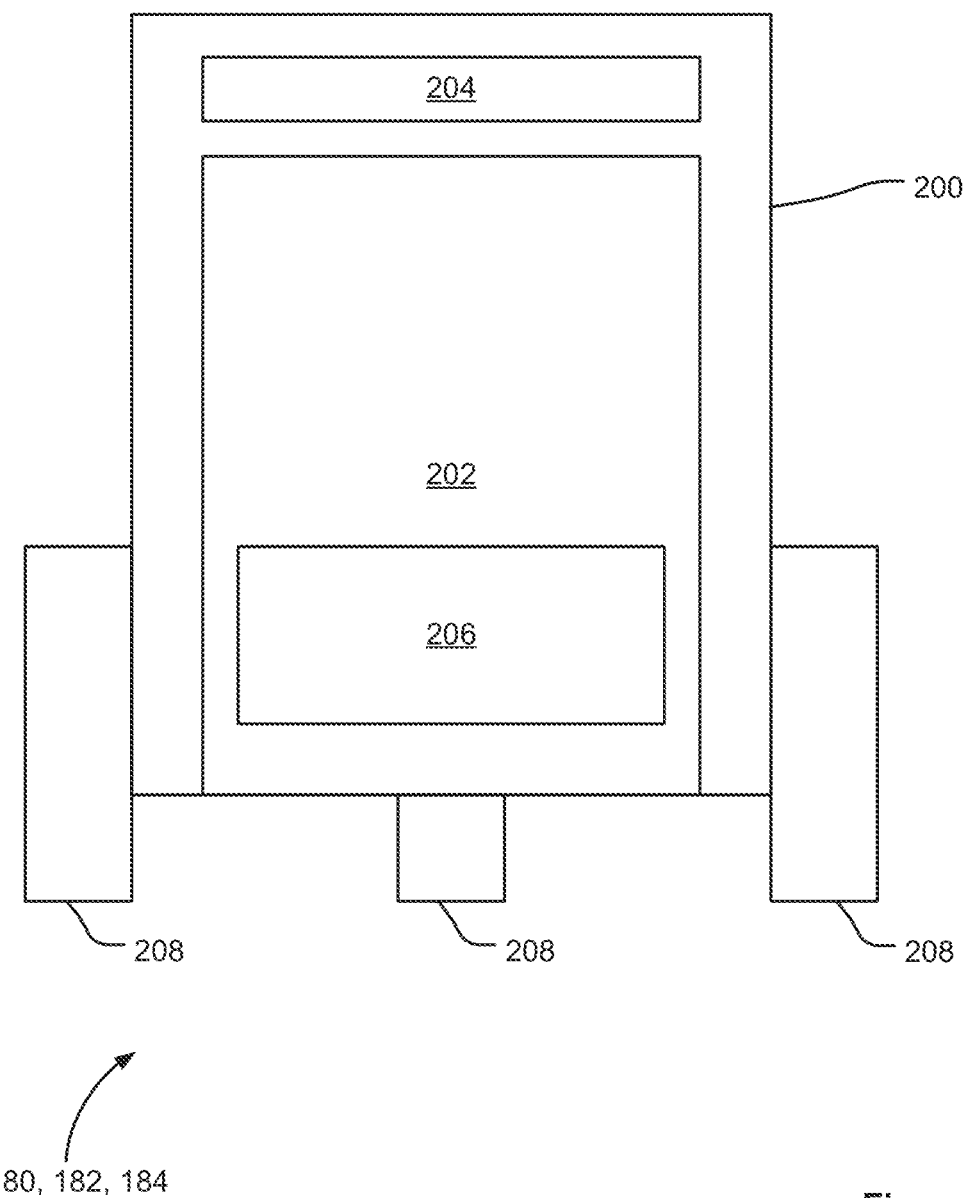
FIG. 3 is a schematic diagram of a robot module of FIG. 2 in greater detail.

Referring to FIG. 3, each of the first, second and third robot modules 180, 182, 184 comprises a housing 200 and a local item store 202 for storing a limited distribution, for example range, of items to be vended. A local processing resource 204 is disposed within the housing 200 as well as an access port 206. The robot modules 180, 182, 184 also comprise wheels 208 for drive and steering, the wheels being coupled to drive train and steering mechanisms (not shown), the drive train and steering mechanisms being operably coupled to the local processing resource 204. Although not shown in FIG. 3, the local item store 202 comprises a drive mechanism operably coupled to the local processing resource 204 and a local conveyor chain mechanism arranged to carry the standardised container. The local conveyor chain mechanism is arranged in a continuous loop that passes opposite the access point 206.

Figure 4:
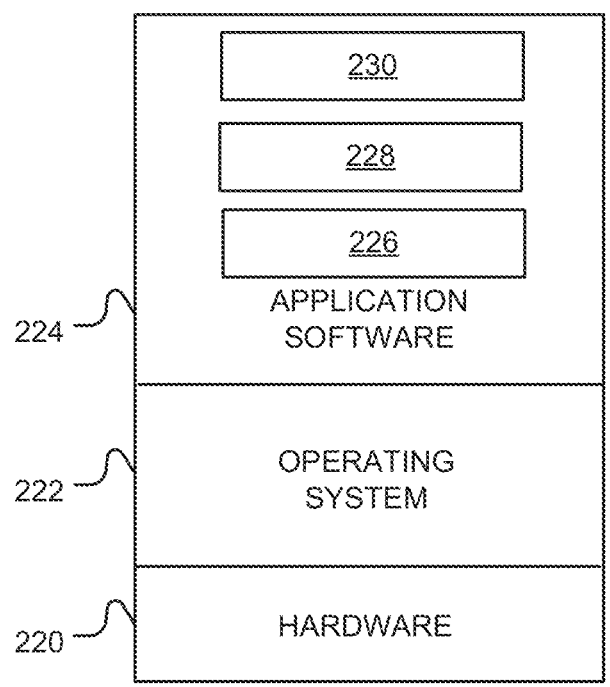
FIG. 4 is a schematic representation of an architectural stack employed by a processing resource module of FIG. 2.
Figure 5:
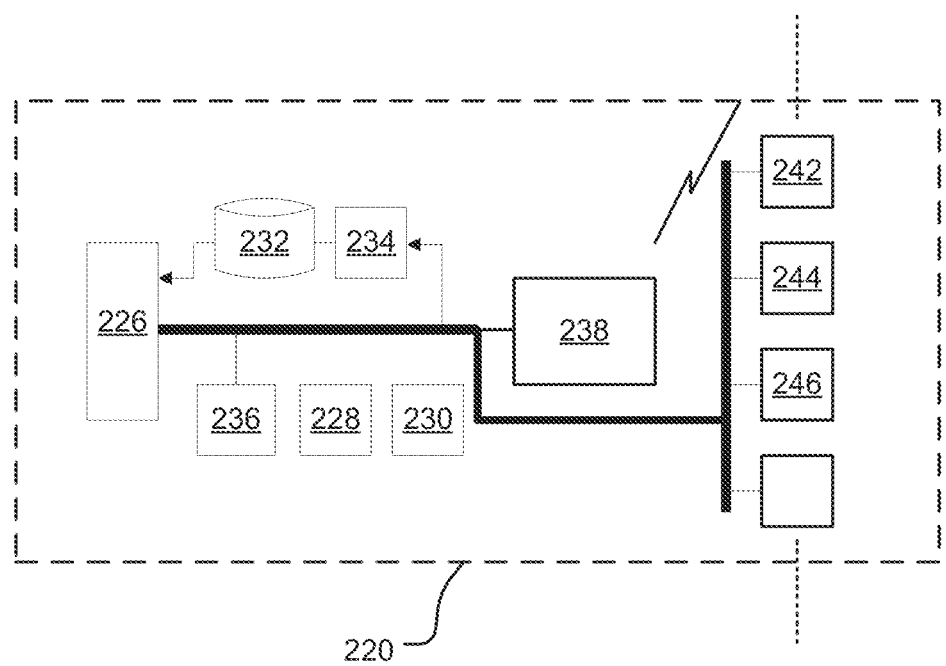
FIG. 5 is a schematic diagram of functional blocks supported by the processing resource module of FIG. 2 in greater detail.

Referring to FIG. 4, the central processing resource module 186 of the vending system 100 is, in this example, implemented using a general purpose computer 220, for example a Personal Computer (PC) executing any suitable operating system. For the sake of conciseness and clarity of description, the computer will not be described in detail as the component parts are well understood. However, it will be appreciated by the skilled person that the computer comprises one or more processors, memory and a storage device, for example a hard disc drive (HDD), and input and output devices (as required). The computer 220 supports an operating system 222 for execution by functional hardware components 221, which provides an environment in which application software 224 can run. The computer 220, depending upon the specific configuration of the computer, executes any suitable operating system, for example Windows®, MacOS®, UNIX® or a distribution of Linux®. The operating system supports the execution of applications 224 to implement operation of the vending system 100. The operating system 222 serves to control the functional hardware components 221 and resides between the application software 224 and the functional hardware components 221. Referring to FIG. 5, the application software 224 comprises, for example, a choreographing engine 226 application that is capable of accessing a database 232 stored by the HDD, a reward signal module 228 and a behaviour determination module 230. The application software 224 also comprises a database update module 234 application and an order processing engine 236.

In addition to the database 232, the choreographing engine 226 is capable of communicating with the order processing engine 236, which is capable of communicating with a communications module 238. The communications module 234 is also capable of communicating with the choreographing engine 226 and the database update module 234.

In this example, the communications module 238 is capable of communicating with the payment point module 110 and the touch screen device 112, either wirelessly or using a wired connection. The computer 220 also supports other applications and/or data sources 240 that are capable of communicating with the choreographing engine 226 in order to support the choreographing engine 226 in issuing instructions to the main item store 130, the first secondary item store 132, the second secondary item store 134, the third secondary item store 136 as well as the first, second and third robot modules 180, 182, 184. For example, the operating system supports 222 supports a stock level management module 242, an item temperature module 244, and a shelf life monitoring module 246.

Figure 6:
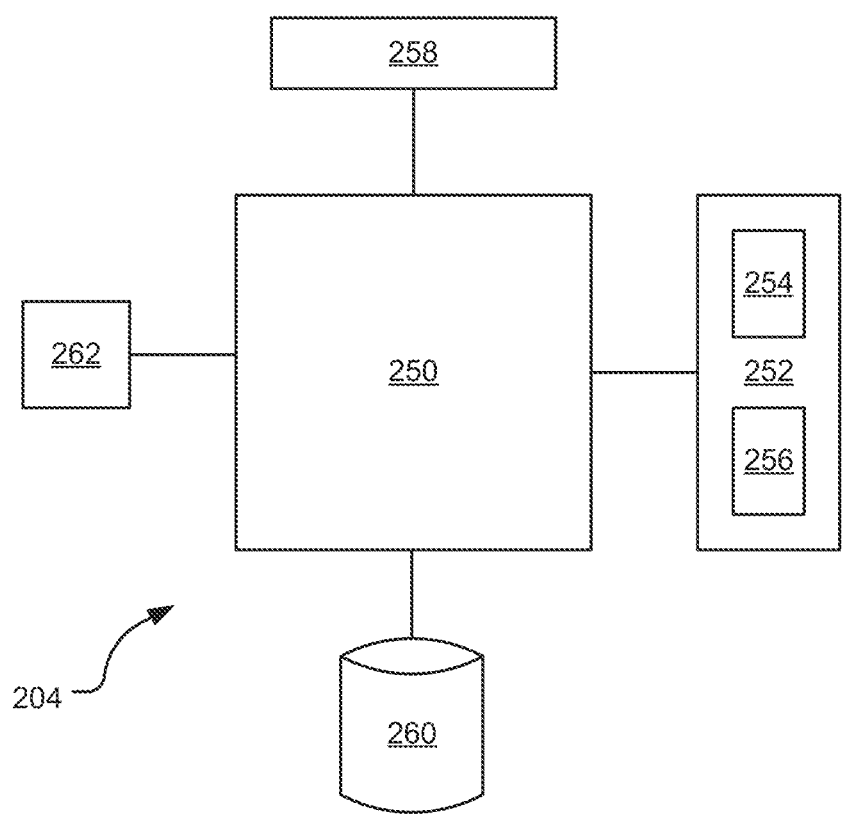
FIG. 6 is a schematic diagram of a local processing module of the robot module of FIG. 3.

Turning to FIG. 6, the local processing resource 204 comprises a controller 250 operably coupled to a motion driver unit 252, the motion driver unit 252 comprising a wheel/powertrain sub-driver 254 and a cable motion sub-driver 256. The controller 250 is also operably coupled to a store driver unit 258 and a data storage unit, for example a digital memory unit comprising a map database 260, the map database 260 comprising layout details of the inside of the housing 102, for example the locations of the first upper item access port 138, the second middle item access port 140, the third lower item access port 142, the first secondary item access port 144, the second secondary item access port 146, the third secondary item access port 148, the fourth secondary item access port 150, the fifth secondary item access port 152, the sixth secondary item access port 154, the seventh secondary item access port 156, the eighth secondary item access port 158, the ninth secondary item access port 160, the first vertical cable pair 162, the second vertical cable pair 164, the third vertical cable pair 166, the first upper ledge 168, the second middle ledge 170, the third lower ledge 172, the first transverse path 174, the second transverse path 176, and the third transverse path 178. The controller 250 is also operably coupled to a local communications module 262.

Figure 7:
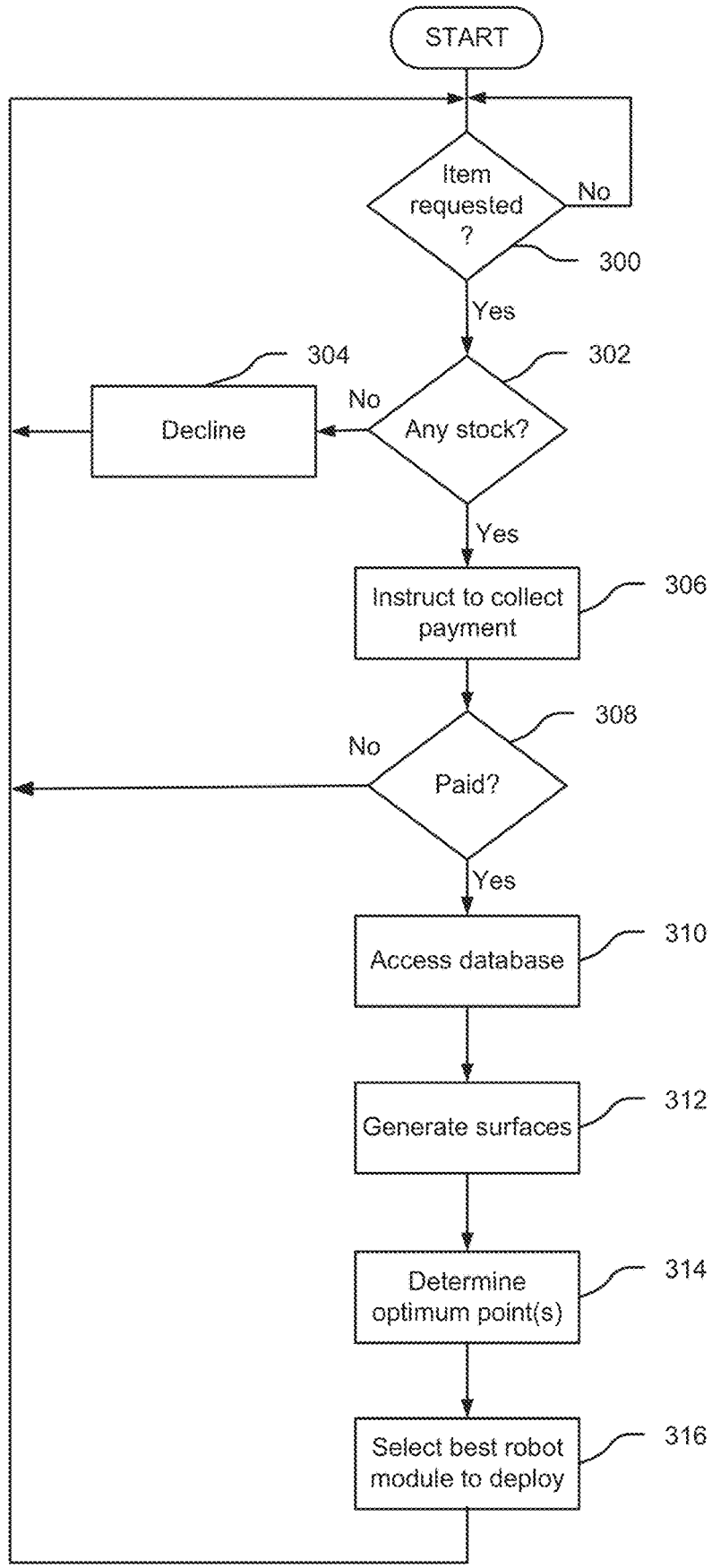
FIG. 7 is a flow diagram of a first part of a method of automatically vending an item constituting another embodiment of the invention.

In operation (FIG. 7), upon start-up, the computer 220 generates a forecast of demand for items, using any suitable technique, for example by generating a function that is a Poisson point process using historical vending data and any other useful parameters. The function is then integrated to yield a probability density function that can be used to determine a most likely demand in respect of each of the delivery ports 104, 106, 108. A heuristic approach is then taken to determine initial positions of the robot modules 180, 182, 184 relative to the item access ports 138, 140, 142, 144, 146, 148, 150, 152, 154, 156, 158, 160. The computer 220 then communicates the initial respective positions to the first, second and third robot modules 180, 182, 184 assume initial respective positions, if not already placed in the positions.

Figure 8:
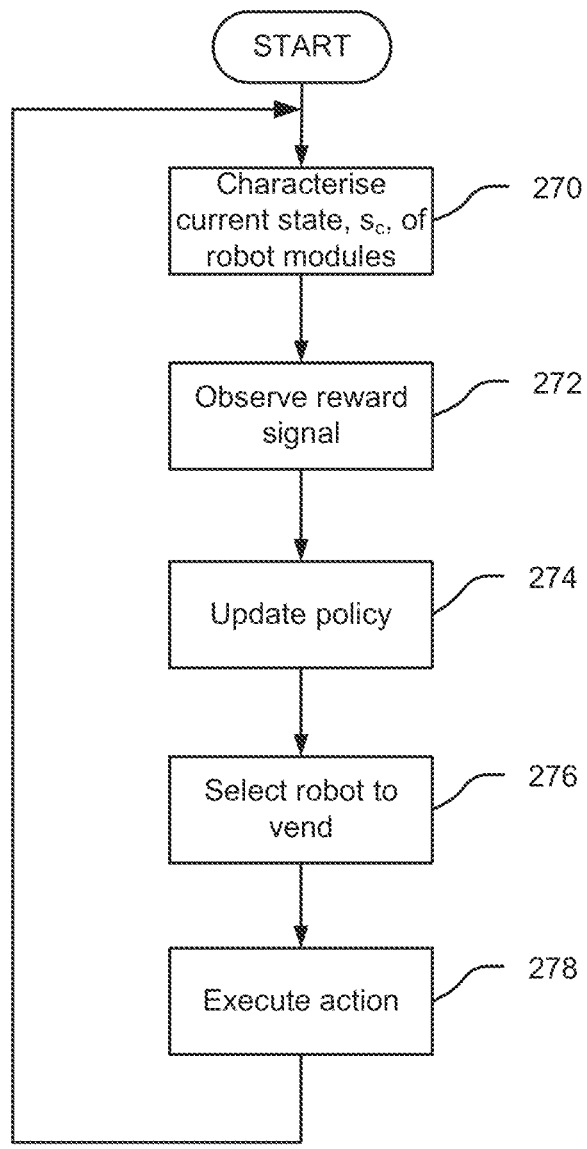
FIG. 8 is a flow diagram of a second part of a method of FIG. 7.

The order processing engine 230 awaits (Step 300) a request to vend an item, which is selected by a user through the touch screen device 112. Once an item has been requested, the order processing engine 230 accesses the database 232 in order to determine (Step 302) whether the vending system 100 is carrying any stock of the requested item. If the requested item is not carried by any of the first, second or third robot modules 180, 182, 184, the main item store 130, or the first, second, or third secondary item stores 132, 134, 136, then the order processing engine 230 instructs the touch screen module 112 to communicate (Step 304) the lack of stock to the user and that the request is declined. The order processing engine 230 then returns to awaiting a request to vend. In the event that the order processing engine 230 determines that the vending system 100 has the item in stock, the order processing engine 230 instructs (Step 306) the payment point module 110 to take payment from the user. When payment has been determined to have been made (Step 308), the order processing engine 230 communicates the identity of the requested order to the chorographing engine 226. Otherwise, the order processing engine 230 returns to awaiting a request to vend. Referring to FIG. 8, if payment is made, the chorographing engine 226 then communicates the states of each of the robot modules 180, 182, 184 characterised (Step 270) by, for example, location within the housing 102 and/or stock level of items stored, to the reward signal module 228, which calculates (Step 272) a reward signal in respect of each of the robot modules 180, 182, 184. The reward signal module 228 then communicates the reward signals to the behaviour determination module 230, which updates (Step 274) a policy being executed when employing a machine learning technique, for example a Reinforcement Learning technique, in order to select (Step 276) which of the three robot modules 180, 182, 184 to fulfil the request to vend and which of the delivery ports 104, 106, 108 to use to provide access to the user to the item purchased. The behaviour determination module 230 then communicates the selected action to the chorography engine 226, which communicates an instruction to the selected robot module to provide and/or collect and provide the item requested via the selected delivery port 104, 106, 108. The selected robot module then implements (Step 278) the instruction in order to provide the item requested to the selected delivery port. Such implementation can involve translating along the first, second and third ledges 168, 170, 172, the first, second and third transverse paths 174, 176, 178, and/or the first, second and third cable pairs 162, 164, 166. In respect of the latter, each robot module 180, 182, 184 carries a cable scaling arrangement that can engage any of the cable pairs 162, 164, 166 in order to climb them and also move in a transverse direction to the cable pairs 162, 164, 166 in order to move the robot modules 180, 182, 184 over an end of a selected transverse path 174, 176, 178 or clear of a given transverse path 174, 176, 178.

In other examples, as will be described hereinafter in relation to a scaled implementation, the functions calculated by the chorographing engine 226 can be used to perform more complex operations, for example, the transferrance of an item from one robot module to another, collection of an item from the main item store 130 or one of the first, second or third secondary item stores 132, 134, 136 (or equivalents), restocking of a robot module from the main item store 130, or the first, second, or third secondary item stores 132, 134, 136 and/or selection of a robot module based on a desire to restock the robot module.

In another embodiment, the above implementation can be adapted and scaled to cover a geography. In this regard, the robot modules can be automomous vehicles and/or vehicles driven by human drivers and/or semi-automomous vehicles having human drivers, the driving of which is machine assisted.

A main customer fulfilment centre can constitute the main item store 130 mentioned above and subsidiary fulfilment centres can constitute the secondary item stores 132, 134, 136. Other layers of fulfilment centre are conceivable. However, it should be understood that at least some of the vehicles mentioned above are intended to comprise a distribution or "assortment" of items in varying quantities.

Figure 9:
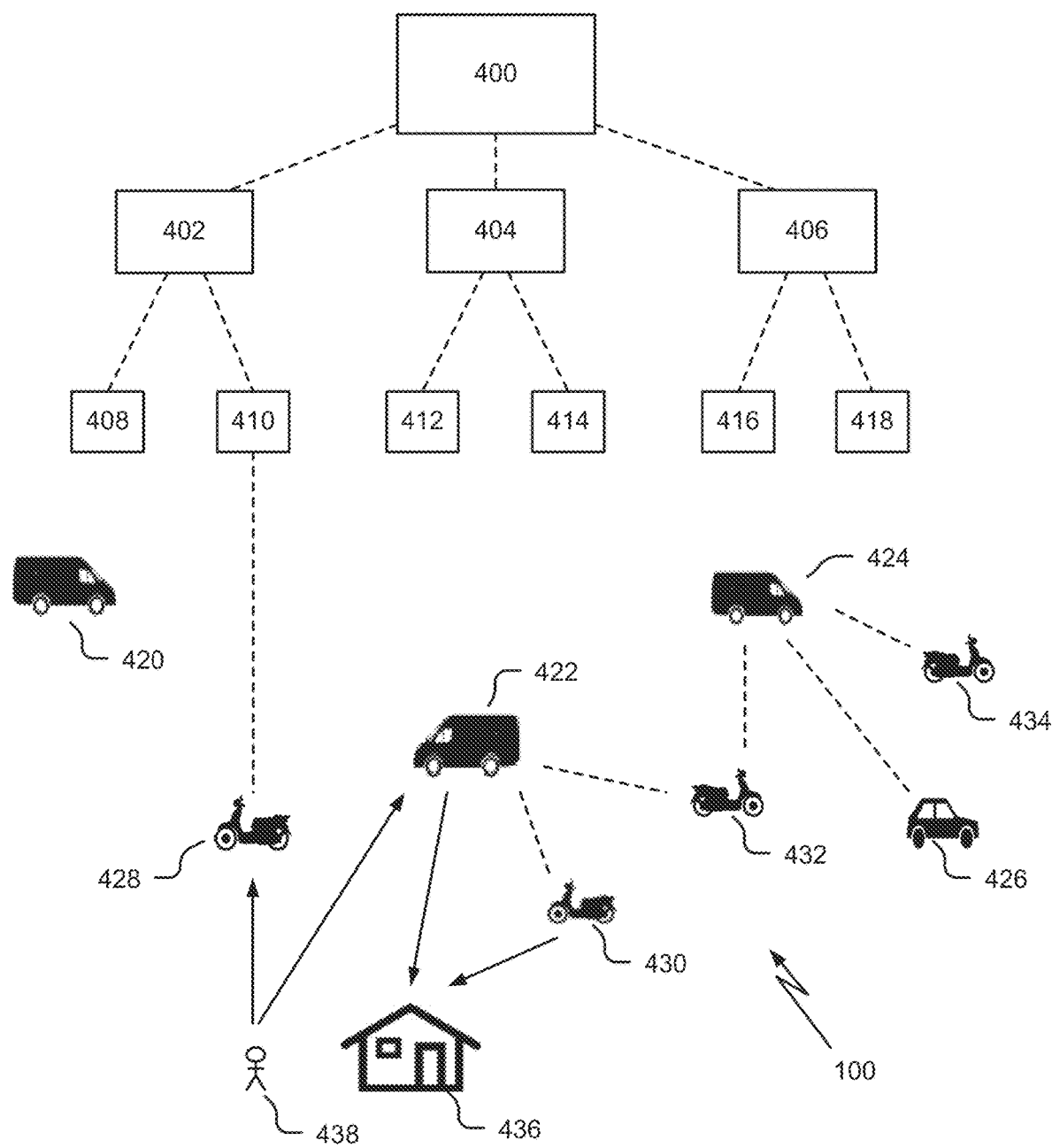
FIG. 9 is a schematic diagram of another vending system constituting a further embodiment of the invention.

Referring to FIG. 9, the vending system 100 comprises a first tier storage unit 400, which can be a very large warehouse, sometimes referred to as a customer fulfilment centre. The first tier storage unit 400 is designated to serve a first second tier storage unit 402, a second second tier storage unit 404 and a third second tier storage unit 406. Optionally, and in this example, a plurality of third tier storage units is provided comprising a first third tier storage unit 408, a second third tier storage unit 410, a third third tier storage unit 412, a fourth third tier storage unit 414, a fifth third tier storage unit 416 and a sixth third tier storage unit 418.

In this example, the first tier storage unit 400, the first, second and third second tier storage units 402, 404, 406 and the first, second, third, fourth, fifth and sixth third tier storage units 408, 410, 412, 414, 416, 418 are permanently at fixed locations and are so-called "bricks and mortar" units. In this example, the first second tier storage unit 402 is designated to cooperate with the first and second third tier storage units 408, 410. The second second tier storage unit 404 is designated to cooperate with the third and fourth third tier storage units 412, 414, and the third second tier storage unit 406 is designated to cooperate with the fifth and sixth third tier storage units 416, 418. In this respect, the associations between the tiers of storage units relate to the ability to transfer stock of items between the storage units. However, it should be appreciated that the associations between the first and second tiers of storage units, and the second and third tiers of storage units can vary depending upon considerations relating to implementation convenience, for example geography. Indeed, for example, a second tier storage unit can be designated to cooperate with a single third tier storage unit or more than two third tier storage units, or indeed other second tier storage units. The same approach applies equally to the relationship between the first and second tier storage units. Furthermore, it is conceivable that one or more of the third tier storage units are designated to cooperate with the first tier storage unit, without the involvement of a second tier storage unit. In this respect, it should be appreciated that the hierarchy is not specified in a rigid manner and the hierarchy described herein is simply exemplary.

The vending system 100 further comprises a first motorised vehicular storage unit, for example a first van 420, a second motorised vehicular storage unit, for example a second van 422, and a third motorised vehicular storage unit, for example a third van 424. A fourth mobile vehicular storage unit, for example a car or automobile 426 is also provided as well as a fifth smaller vehicular storage unit, for example a first bicycle or motorcycle 428, a sixth smaller vehicular storage unit, for example a second bicycle or motorcycle 430, a seventh smaller vehicular storage unit, for example a third bicycle or motorcycle 432, an eighth smaller vehicular storage unit, for example a fourth bicycle or motorcycle 434. Each of the fifth, sixth, seventh and eighth smaller vehicular storage units 428, 430, 432, 434 have a much smaller storage capacity than the first, second and third vans 420, 422, 424. In this example, a dwelling, for example a house 436 is located in a geographic region and constitutes a delivery end point. Of course, the skilled person will appreciate that the above example architecture can be scaled to cover a much greater georgraphic area and so the vending system 100 can comprise a far greater number of first tier storage units, second tier storage units, third tier storage units, mobile storage units, smaller vehicular storage units and delivery end points, for example dwellings.

Figure 10:
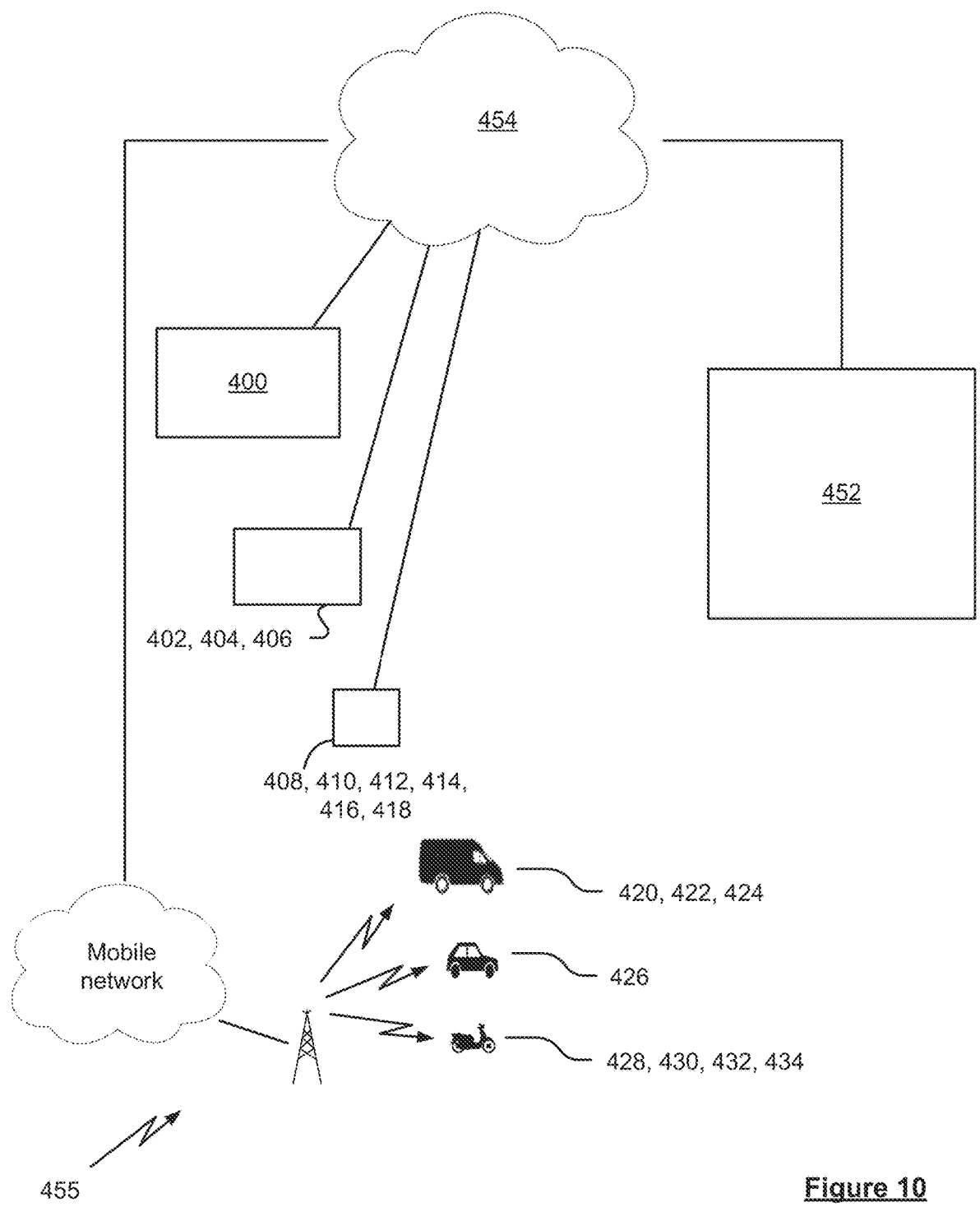
FIG. 10 is a schematic diagram of a communications infrastructure of the vending system of FIG. 9.

Turning to FIG. 10, the architecture of the vending system 100 comprises a communications infrastructure 450. In this respect, a central processing resource 452 is capable of communicating with the first tier storage unit 400, the first, second and third second tier storage units 402, 404, 406, and the first, second, third, fourth, fifth and sixth third tier storage units 408, 410, 412, 414, 416, 418 via a Wide Area Network (WAN), for example the Internet 454. In this example, the central processing resource 452 is connected to the Internet via a wired connection. Similarly, the first tier storage unit 400, the first, second and third second tier storage units 402, 404, 406, and the first, second, third, fourth, fifth and sixth third tier storage units 408, 410, 412, 414, 416, 418 are connected to the Internet 454 via respective wired connections. However, the skilled person should appreciate that wired connections are not essential and one or more of the connections to the Internet 454 can be wireless. The first, second and third vans 420, 422, 424, the car 426 and the first, second, third and fourth motorcycles 428, 430, 432, 434 are each capable of communicating with the Internet 454 and hence the central processing resource 452 via respective wireless connections, for example via a cellular communications network 455, such as a Long Term Evolution (LTE) communications network. However, the skilled person should appreciate that the examples set forth herein are not limited by any specific wireless technology and other wireless technologies, for example WiMAX®, are contemplated.

Figure 11:
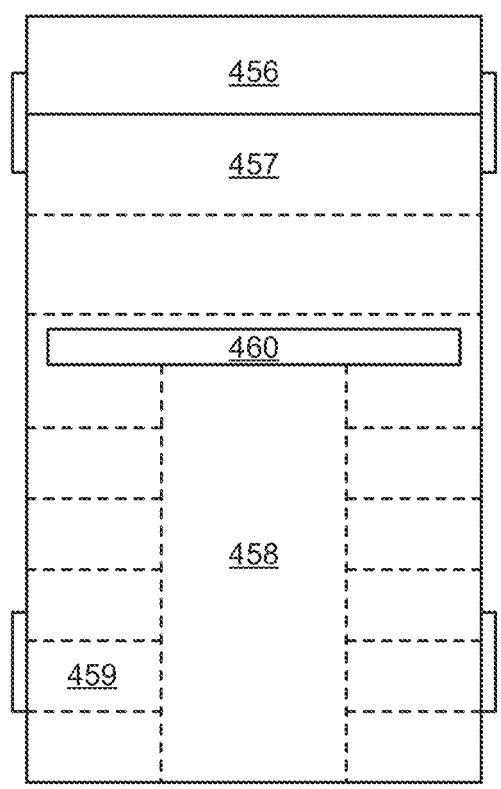
FIG. 11 is a schematic plan view of a vehicle of FIG. 9 in greater detail.

Referring to FIG. 11, the motorised vehicular storage unit 420, 422, 424 comprises an engine compartment 456, a driver compartment 457 and a stock compartment 458. In this example, the stock compartment 458 comprises a local processing resource 460, part of which is disposed in the stock compartment 458. The stock compartment 458 is configured to store a distribution of items, in differing quantities, in an organised fashion so as to be readily accessible to a driver or other operator of the motorised vehicular storage unit 420, 422, 424. The skilled person will appreciate that the motorised vehicular storage unit 420, 422, 424 comprises other features common to many other vehicles. As such features are well known, for the sake of conciseness and clarity of description, these features will not be described in further detail herein. The mobile vehicular storage unit 426 and the smaller vehicular storage units 428, 430, 432, 434 are, in this example, analogously structured, but adapted to suit the constraints of the size of these vehicles.

Figure 12:
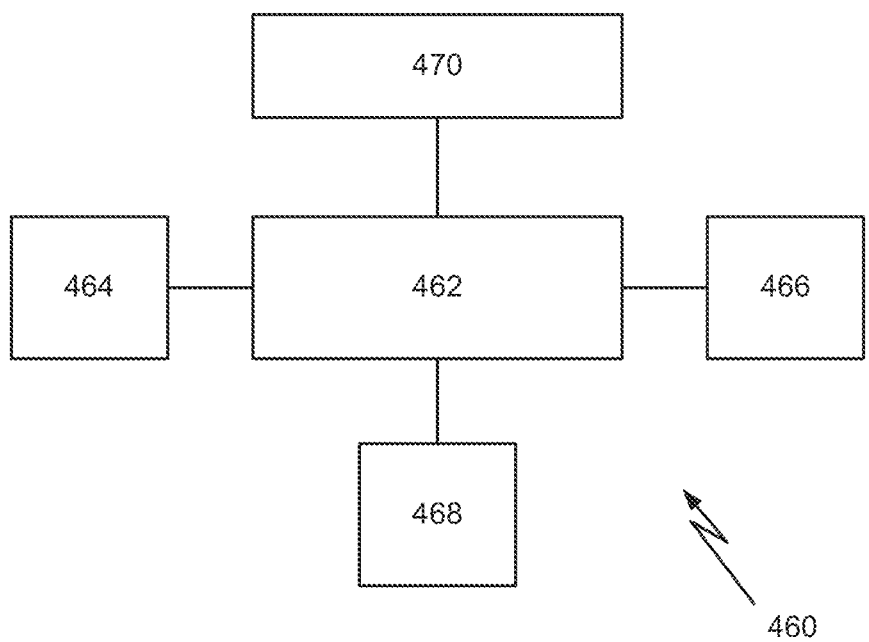
FIG. 12 is a schematic diagram of a processing resource of the vehicles of FIG. 9 in greater detail.

Referring to FIG. 12, in this example, each vehicular storage unit comprises the local processing resource 460 as mentioned above, for example a small computing device capable of providing information to a driver or rider and/or navigation information. In this regard, the local processing resource 460 comprises a control unit 462 operably coupled to an input device 464, for example one or more keys or a keypad, and an output device 466, for example a display device; the input device 464 and the output device 466 are disposed in the driver compartment 457. In some examples, the input and output devices 464, 466 can be combined through use of a touch screen device. A local communications module 468 is operably coupled to the controller 462. A navigation subsystem 470 is also operably coupled to the controller 462. In this respect, the navigation subsystem 470 provides Personal Navigation Device (PND) functionality and comprises a GNSS receiver and the necessary associated components, for example processing capability and access to maps, in order to provide navigation directions to the driver to a destination using the output device 466. As the structure and operation of the navigation subsystem 470 is not central to the examples set forth herein, for the sake of clarity and conciseness of description, details of the structure and operation of the navigation subsystem 470 will not be described in further detail. If audible instructions are required, the controller 462 can also be operably coupled to an audible output device (not shown), for example a loudspeaker, disposed in the driver compartment 457.

Figure 13:
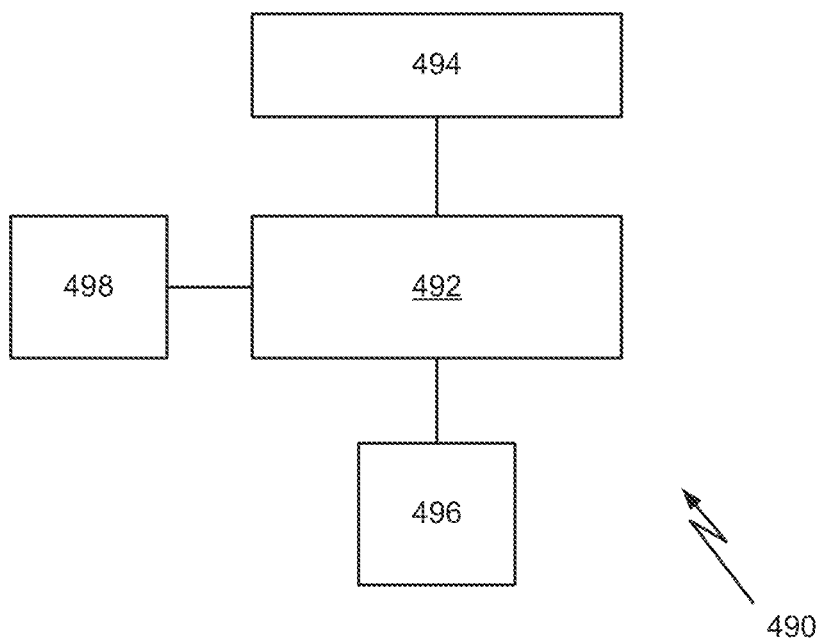
FIG. 13 is a schematic diagram of a processing module of the storage units of FIG. 9.

Referring to FIG. 13, the first tier storage unit 400, the second tier storage units 402, 404, 406 and the third tier storage units 408, 410, 412, 414, 416, 418 each comprise an inventory management processing resource 490. In this example, the inventory management processing resource 490 comprises a processing unit 492 operably coupled to a communications module 494. An output device 496, for example a display device, and/or an inventory management interface 498 is/are operably coupled to the processing unit 492. The processing unit 492, the communications module 494 and the output device 496 can be implemented using a general purpose computing apparatus, for example a PC, executing appropriate software. Although not shown, where one of the storage units comprises an automated or semi-automated inventory manipulation system, for example a robotic system to store and retrieve items of stock within a storage unit, the inventory management interface 498 is employed to provide instructions to and receive feedback from the automated inventory manipulation system.

Figure 14:
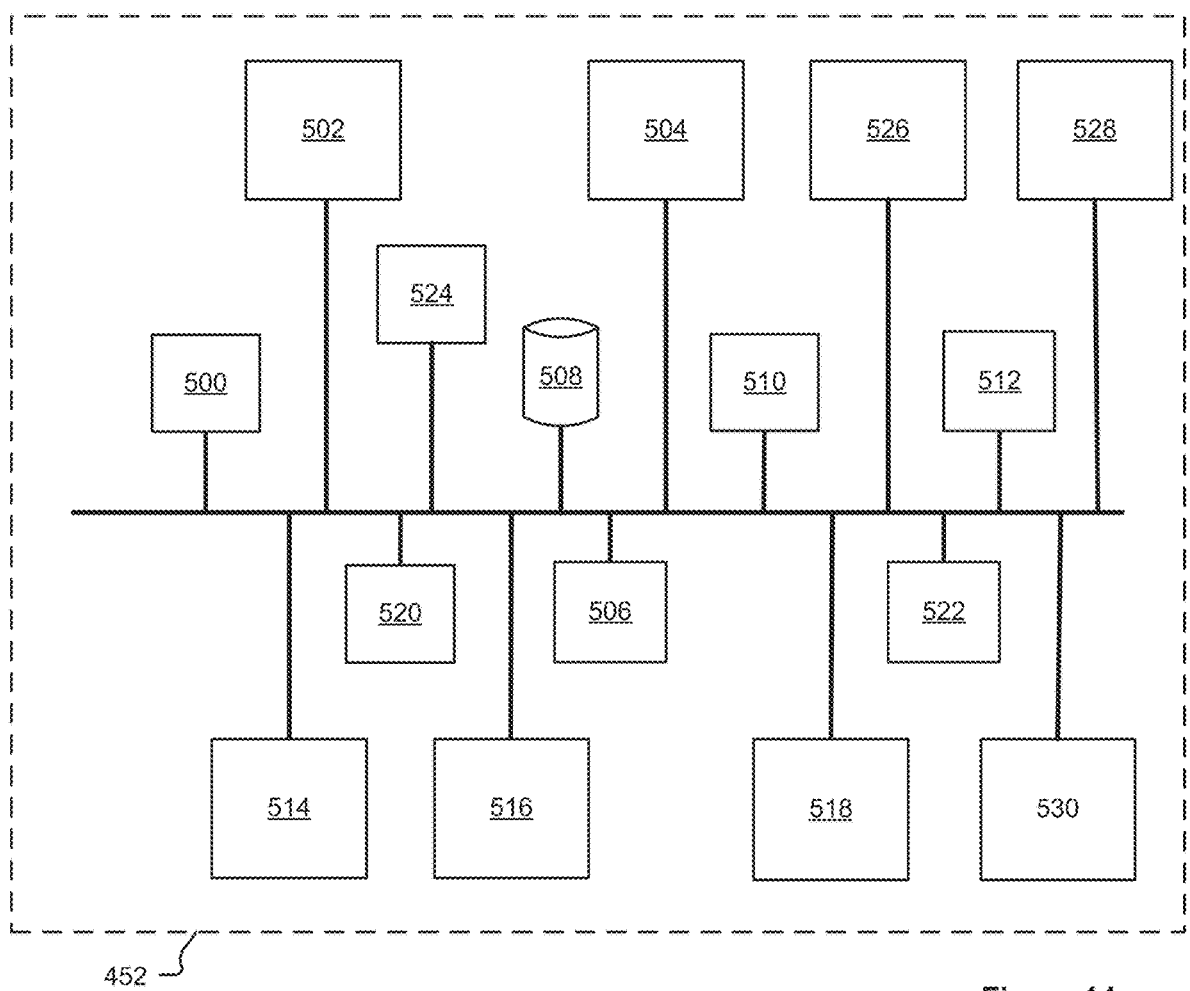
FIG. 14 is a schematic diagram of a central processing resource of FIG. 10.

Turning to FIG. 14, the central processing resource 452 will be described as supported by a single computing apparatus. The computing apparatus is of standard construction and comprises one or more processors, input devices, output devices, memories and storage devices. As such, for the sake of clarity and conciseness of description, a detailed recitation of the hardware employed to support the central processing resource 452 will not be described in further detail. However, it should be appreciated that multiple computing apparatus can be employed, which can be collocated, for example rack mounted in a data centre, or distributed over a geography at multiple sites, but in communication via the Internet or, for example, one or more dedicated leased lines.

In this example, the central processing resource 452 supports a choreography engine 500 capable of communicating with a geospatial data module 502. The geospatial data module 502 comprises data relating to, for example, parking availability, and can respond to requests for geospatial data concerning, for example, specific positions or areas. An economic data module 504 is also provided that collects and supplies information relating to items that are held in the vending system 100 for sale, for example information relating to commercial aspects of the item, such as purchase and sale prices. The economic data module 504 is capable of communicating with a database maintenance module 506, which is capable of accessing a database 508 of information relating to many aspects of the vending system 100, the database maintenance module 506 being capable of reading from and writing to the database 508. The central processing resource 452 also comprises a forecasting module 510, a reward calculator module 512, a sales history data module 514, a calendar module 516 and a stock level monitoring module 518, which are capable of communicating with other modules of the central processing resource 452.

The central processing resource 452 further comprises a traffic monitoring module 520, a behaviour determination module 522, a weather monitoring module 524, and a logistics module 526 capable of communicating with the other modules of the central processing resource 452. An e-commerce module 528 is also provided and supports, for example, web-based ordering and payment collection. The e-commerce module 528 is, in some examples, capable of generating e-commerce portals specific to certain geographic areas. The central processing resource 452 also comprises a communications module 530 capable of communicating over the Internet 454.

Examples of operation of the vending system 100 of FIGS. 9 to 14 will now be described in the context of two envisaged scenarios, namely vehicles moving between respective locations for the purpose of vending from those locations for a predetermined period of time, and vehicles "swarming", or driving around, in a predetermined area and receiving instructions on-the-fly to vend at locations to which the vehicles have to drive as orders are received by the vending system 100 to fulfil. In this respect, the first scenario requires collection from the vehicle at the location, whereas swarming vehicles deliver to the customer at a location of choice of the customer, for example the dwelling 436 (FIG. 9). Other scenarios are also possible, but for the sake of clarity and conciseness of description, the examples set forth herein will be confined to these scenarios as they are considered sufficient to exemplify the concepts expounded herein.

Figure 15:
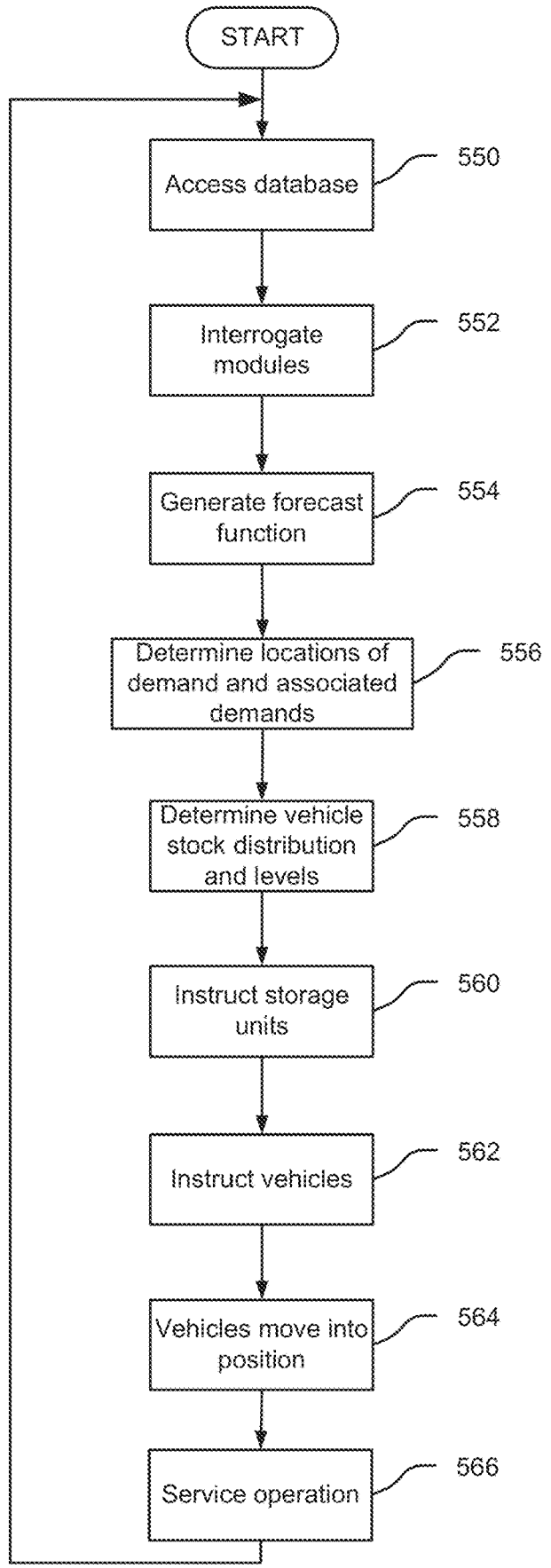
FIG. 15 is a flow diagram of a first part of another method of automatically vending an item constituting yet a further embodiment of the invention.
Figure 16:
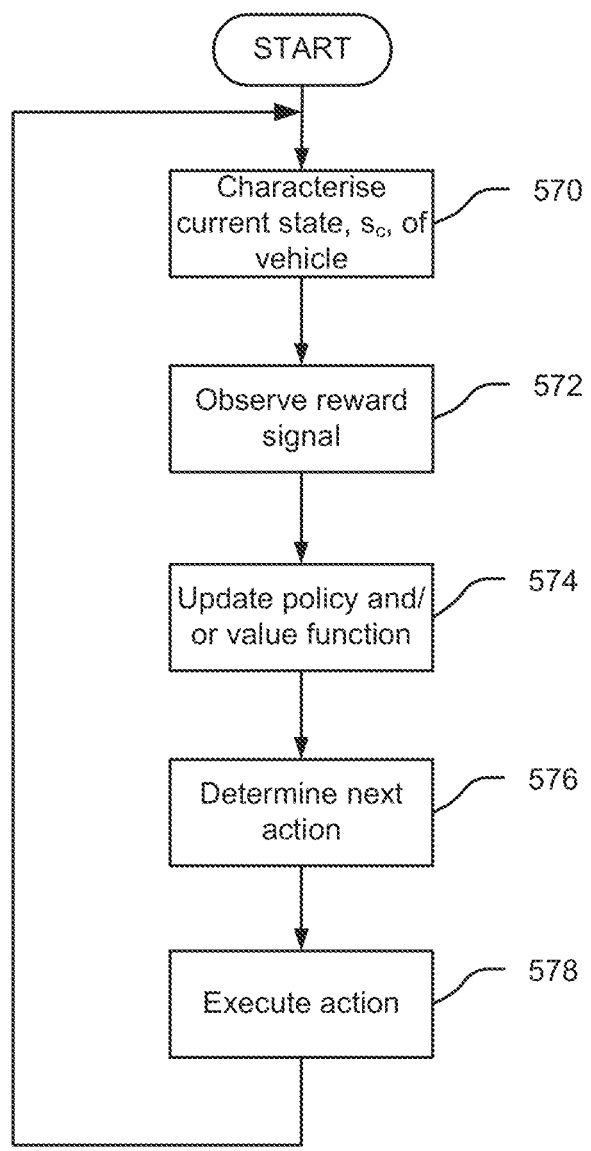
FIG. 16 a flow diagram of a second part of the method of FIG. 15.

In operation (FIG. 15), there are, for example, three categories of operation that lead to and include the running of the vending system 100. In this respect, a method of vending comprises a forecasting, an initial setup and then a choreographing of the vehicles. In this example, this is respective of whether the vehicles are vending from the fixed locations or swarming.

In the forecasting phase, the forecasting module 510 accesses (Step 550) the database 508 and/or interrogates (Step 552) other modules, for example the stock level module 518, the sales history data module 514, the e-commerce module 428 for data concerning future orders placed, and current promotions associated with items, the weather monitoring module 524, and the calendar module 516. The skilled person should appreciate that the use of these modules and the associated data that they can provide is exemplary only and a fewer number or greater number of modules and/or data sources can be relied upon to provide data in order to generate an initial forecast. For example, a social media connector can be provided and social media data used. Similarly, sensor data from the premises of patrons can be employed, where for example Internet of Things (IoT) devices, for example a so-called "smart" refrigerator, are present and configured to provide data to the forecasting module 510. The forecasting module 510 uses some or all of the above-mentioned data to generate (Step 554) a function constituting a Poisson point process for each item. For the sake of ease of understanding and hence clarity, it should be appreciated that the number of parameters and items described hereafter is limited. However, it should be also be appreciated that the function can be scaled to have multiple dimensions that covers all items in a catalogue supplied by the vending system 100 or a large number of them. Furthermore, although a Poisson point process is being used here to generate a demand forecast, the skilled person should appreciate that any other suitable processes can be employed.

In a simple example of forecasting, the vending system 100 seeks to determine demand, for example a forecast of a most likely number of a given item, sometimes referred to as "eaches", for example the number of "eaches" a 1 litre bottle of milk for a given time window, for example 12:00 to 13:00, on a given date/day of the week for a given region (identified by coordinates). The item, in this case the milk, has to be indexed in some way and this is achieved using, for example so called Stock Keeping Units (SKUs).

The function generated is therefore:

$f_{SKU}(x, y, t, d)$, where x, y identify location, t is the time data d is demand.

This function is a continuous time function, and if integrated (Step 554) in respect of three of the variables over the geographic region in question and a given time window ($t_0$, $t'$), we arrive at a function that can be used to compute the demand of the SKU for the region and time window. The integrated function $F_{SKU}(d)$ is a probability density function.

$\iiint_{Region,[t_0,t]} f_{SKU}(x, y, t, d) dx\, dy\, dt = F_{SKU}(d)$ $ARGMAX_d\, F_{SKU}(d)$ Applying the ARGMAX function yields a maximum likelihood estimate of the demand in "eaches". This can therefore be used to forecast the demand of each SKU. As this function has been described in respect of a single SKU, the process is repeated for multiple SKUs in the catalogue of the vending system 100 for each location and time period of interest.

Once the forecasting module 510 has generated the demand calculation function, it is used for the initial setup mentioned above. In this respect, the logistics module 526 requests (Step 556) from the forecasting module 510 data indicative of a predetermined number of items having highest associated most likely "eaches" in respect of location data available. It should be appreciated that, in this regard, the granularity of the location data can depend upon implementation requirements, for example appropriately sized cells based on vehicles' ranges or at a road segment level. The logistics module 526 uses the identities of the items in highest demand and associated locations to determine heuristically the initial locations of the vehicles, for example by applying a least squared technique where it is desirable to locate a vehicle between several locations where there is sufficient demand. The demand data is also used to determine (Step 558), given limitations of capacity of the vehicles, the assortment of the most in-demand items. Indeed, limitation of the assortment of items carried by each vehicle can be limited by one or more different parameters, for example absolute profit margin or selection of less in-demand items, but items that nevertheless pair well together, i.e. are often sold together. Once the location, assortment carried and stock levels for each vehicle has been determined, the logistics module 526 sends, using the communications module 530, instructions (Step 560) to the relevant storage units 400, 402, 404, 406, 408, 410, 412, 414, 416, 418 to arrange stock as appropriate for stocking the vehicles with the determined respective stock levels and assortments and then to stock the vehicles in accordance with those determined respective stocking profiles. Once stocked, the logistics module 526 sends instructions (Step 562) to the vehicles to drive to the respective locations determined. In this respect, the local processing resource 460 of each vehicle involved in the plans of the logistics module 526 receives a respective instruction message identifying a location to which to drive. For each vehicle, the message is received and the controller 462 interacts with the navigation sub-system 472 in order to provide the driver of each vehicle with instructions to reaching the destination location instructed (Step 564). Of course, if one or more of the vehicles are autonomous or semi-autonomous, the vehicle drives automatically to the identified location using any suitable self-driving methodology. The data determined by the logistics module 526 is also communicated to the choreography module 500.

Once the initial locations have been reached or are in the process of being reached, the vending system 100 can proceed to service operation (Step 566), which can be considered a steady-state mode of operation, which is the choreographing mentioned above.

For the sake of simplicity of description and hence clarity, the following example will be described in the context of one of the vehicles and a limited number of parameters. However, the skilled person should appreciate that the number of parameters can be greater or fewer and the activities described in relation to a single vehicle is implemented in relation one or more of the remaining motorised vehicular storage units.

Therefore, turning to the first van 420, once the initial set-up stage has been completed and the van 420 is implementing the instructions received from the logistics module 526, the choreography engine 500 of the central processing resource 452 determines the initial state of the van 420.

In accordance with any suitable reinforcement learning technique, the choreographing engine 500 determines (Step 570 a current state, $S_c$, of the van 420. The current state, $S_c$, of the van is defined, in this example, by a current time slot and associated date, a location of the van 420, a level of fuel stored by the van 420 in its fuel tank (not shown), and forecast demand at the current location. However, it should be appreciated that a greater or fewer number of parameters can be used to define the current state, $S_c$, of the van 420. For example, the parameters can comprise, assortment and stock contained in the van 420, future order data, traffic data, predetermined road speed data, and/or a shift end time data.

In relation to the current state, $S_c$, of the van 420, the reward calculator module 512 then calculates (Step 572) a so-called reward signal, $R_c$. The reward signal, $R_c$, can be calculated using any suitable technique. In this example, a number of different metrics can be employed in order to assess the current reward signal, $R_c$. In this example, the reward calculator module 512 obtains demand data from forecasting module 510 relating to the forecast of orders for the current location of the van 420 and, using price and cost data from the economic data module 504, calculates a revenue value, which can be translated to a score, for example depending upon predetermined revenue thresholds. However, the calculation of the "score" can be influenced by other factors to which values can be attributed. In this respect, for example, it may be desirable to prioritise certain kinds of sales or customers over others and so the score for such sales or serving such customers can be weighted accordingly. Conversely, some factors can have a score of zero or indeed a negative value. Other examples of reward parameters include updated demand forecasts, agreed deliveries, changing stock-on-hand position (for example, remaining stock and/or stock life), and location costs (for example, traffic levels and/or parking restrictions and/or costs).

The reward calculator module 512 communicates the determined reward signal to the behaviour determination module 522. The policy, $\pi$, stored or encoded into the behaviour determination module 522 is then updated (Step 574) using the reward signal obtained from the reward calculator module 512. Although in this example, the reward signal is calculated by the reward calculator module 512, the skilled person should appreciate that the central processing resource 452 can, in some examples, lack the capability to calculate the reward signal and the reward signal can be provided from an external source. Subsequently, or substantially simultaneously, the choreography engine 500 determines (Step 576) a next action for the van 420, which will result in the current state, $S_c$, of the van 420 transitioning into a next state $S_n$. In this example, the choreography engine 500 requests the behaviour determination module 522 to provide a next action in accordance with the policy, $\pi$, being implemented by the behaviour determination module 522 In this respect, the behaviour determination module 522 implements, in this example, a random action policy, which is developed based upon the reward signals received from the reward calculator module 512. However, in another example, the policy can be pre-trained with historical data or in a simulation. The policy can comprise a number of actions from which the behaviour determination module 522 can select, for example the policy can comprise one or more of: moving to a specified location, return to base for example due to a shift ending, or in order to restock or refuel, wait for a customer to arrive, rendezvous with another vehicle for an inter-vehicle stock transfer, and/or vend an item. The selection of the action can be based upon one or more parameters, for example expected revenue or avoidance of a certain event, such as running out of fuel or being left with perished stock, depending upon implementation preferences for the policy, π. Although initial actions are selected randomly, the aim of the behaviour determination module 522 is for the policy to constitute learnt experience based upon the reward signals observed and so selection of actions randomly eventually becomes used only in certain circumstances. Once an action has been determined by the behaviour determination module 522, for example "move to a new location", the action is returned to the choreography engine 500, which communicates the instruction to the van 420 using the communications module 532. The van 420 then receives the instruction from the central processing resource 452 and executes (Step 578) the instruction. The above process (Steps 570 to 578 is also performed, as mentioned above, in respect of other vehicles in the vending system 100. The above process is also repeated in respect of future time slots for each vehicle subject to the method.

Through allowing the behaviour determination module 522 to make decisions as to next actions and learning from the reward signal obtained in response to the action taken, the behaviour determination module 522 refines the policy, π, being implemented and so evolves to making high quality decisions in order to satisfy one or more objectives of the vending system 100, for example to ensure vehicles are in correct locations in order to maximise revenue and/or attract new customers. However, these are just two examples of objectives and these should not be understood as limiting the embodiments set forth herein. In the context of vehicles driving to fixed locations to vend, the use of the policy enables movement of the vehicles and their respective activities to be managed in a manner that aims to fulfil certain objectives, technical, commercial or otherwise, in an optimum manner. Likewise, in the context of "swarming" vehicles, the policy can be developed in order to optimise the coordination of multiple vehicles in order to fulfil certain objectives, technical, commercial or otherwise. It should be appreciated that the capabilities and functionality described in relation to the different examples differ. It is, nevertheless, intended that to as much as practicably possible the capabilities and functionalities described herein are applicable to all implementations.

While specific examples of the invention have been described above, the skilled person will appreciate that many equivalent modifications and variations are possible.

It should also be appreciated that while the above examples describe machine learning in order to determine the actions to be taken by the vehicles and indeed the skilled person should appreciate that the examples set forth herein are not limited to the Reinforcement Learning paradigm and control of the vehicles is also contemplated using other machine learning paradigms. These can include, for example, planning algorithms that evaluate a small number of potential next locations and greedily choose timing of relocation. Another example is an objective function that is maximised and computes expected future values achieved from executing an action or a planned sequence of actions. Such an approach can include factors such as running costs when a vehicle is stationary, transit costs for executing an action and/or parking costs.

Accordingly, the exemplary embodiments of the invention set forth above are considered to be illustrative and not limiting. Various changes to the described embodiments may be made without departing from the spirit and scope of the invention.

The methods of the above embodiments may be provided as computer programs or as computer program products or computer readable media carrying a computer program which is arranged, when run on a computer or other processor, to perform the method(s) described above.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

The invention claimed is:

1. A robotic vending machine comprising:
a housing including a plurality of delivery ports;
a physical item storage unit for storing therein a distribution of different items to be vended, the physical item storage unit including a plurality of item access ports;
a plurality of transportation mechanisms for transporting items to an identified delivery location, the plurality of transportation mechanisms being arranged to store a number and assortment of items to vend;
a processing resource configured for communicating with the plurality of transportation mechanisms, the processing resource being arranged to support a machine learning module;
a plurality of data sources arranged to provide data to the machine learning module; wherein
the machine learning module is configured to analyse data provided by the plurality of data sources and to determine a plurality of respective actions for the plurality of transportation mechanisms;
the processing resource is configured to generate and communicate respective control instructions to the plurality of transportation mechanisms;
a selected transportation mechanism is configured to receive a select control instruction and to operate in response to the select control instruction in order to convey an item to a determined delivery port of the delivery location,
wherein the processing resource is configured to predict respective initial optimised locations for the plurality of transportation mechanisms relative to one of the plurality of item access ports; and the processing resource is configured to generate and communicate an initial positioning instruction to the one or more of the plurality of transportation mechanisms.

2. A robotic vending machine as claimed in claim 1, comprising:
a communications module operably coupled to the processing resource, the communications module being configured to receive a request to vend an item.

3. A robotic vending machine as claimed in claim 1, wherein the processing resource is configured to determine forecast demands in respect of a plurality of items.

4. A robotic vending machine as claimed in claim 1, wherein the plurality of transportation mechanisms is each configured to store respective distributions of different items.

5. A robotic vending machine as claimed in claim 4, wherein a number of the plurality of transportation mechanisms have a storage capacity and constitute a number of mobile physical item storage units.

6. A robotic vending machine as claimed in claim 1, wherein at least one of the plurality of data sources comprises:
learnt data.

7. A robotic vending machine as claimed in claim 1, wherein the machine learning module comprises:
a policy implementable to determine the plurality of respective actions.

8. A robotic vending machine as claimed in claim 7, wherein the machine learning module comprises:
a reward signal calculator.

9. A robotic vending machine as claimed in claim 8, wherein the machine learning module is configured to update the policy in response to an output reward signal generated by the reward signal calculator.

10. A robotic vending machine as claimed in claim 1, wherein the plurality of transportation mechanisms comprises:
a first transportation mechanism; and
a second transportation mechanism; wherein
the processing resource is configured to identify the first transportation mechanism to convey an item and the second transportation mechanism to convey another item; and
the processing resource is configured to generate and communicate a control instruction to the first transportation mechanism in respect of the item and another control instruction to the second transportation mechanism in respect of the another item.

11. A method of vending an item, the method comprising:
storing a distribution of different items to be vended in a physical item storage unit inside a housing of a robotic vending machine, the housing including a plurality of delivery ports, the physical item storage unit including a plurality of item access ports;
providing a plurality of transportation mechanisms inside the robotic vending machine for transporting items to an identified delivery location;
storing a number and assortment of items to vend respectively in the plurality of transportation mechanisms;
providing a plurality of data sources, inside the robotic vending machine, to a machine learning module for analysing data provided by the plurality of data sources and determining a plurality of respective actions for the plurality of transportation mechanisms;
generating and communicating respective control instructions to the plurality of transportation mechanisms, each of the plurality of transportation mechanisms operating in response to a select control instruction in order to convey a selected item to a determined delivery port of the delivery location;
predicting respective initial optimised locations for the plurality of transportation mechanisms relative to one of the plurality of item access ports; and
generating and communicating an initial positioning instruction to one or more of the plurality of transportation mechanisms.

\* \* \* \* \*